April 21, 1970

T. J. HARRIS ET AL 3,507,550

APPARATUS FOR APPLYING A POTENTIAL
DIFFERENCE ACROSS A LOAD

Filed Jan. 18, 1967

INVENTORS
THOMAS J. HARRIS
WERNER W. KULCKE
ERHARD MAX

BY *John F. Osterndorf*

ATTORNEY

United States Patent Office 3,507,550
Patented Apr. 21, 1970

3,507,550
APPARATUS FOR APPLYING A POTENTIAL
DIFFERENCE ACROSS A LOAD
Thomas J. Harris, Poughkeepsie, N.Y., and Werner W.
Kulcke, Boblingen, and Erhard Max, Sindelfingen, Germany, assignors to International Business Machines
Corporation, Armonk, N.Y., a corporation of New
York
Filed Jan. 18, 1967, Ser. No. 610,106
Int. Cl. G02f 1/26; H01j 31/02, 31/48
U.S. Cl. 350—150
8 Claims

ABSTRACT OF THE DISCLOSURE

Apparatus for accomplishing the charging function for a capacitive load circuit of the electro-optic phase plate type. Dependent on the potential difference applied across the phase plate, a controlled phase difference takes place for a polarized light beam incident on the plate. Electron beam tubes are provided with pairs of targets having different secondary emission phenomena. When accessed by the electron beams, these targets provide the potential difference across the plates.

---

This invention relates to load circuit driving apparatus and, more particularly, to circuitry for driving capacitive loads of the electro-optic phase plate type to affect the polarization of light incident on the phase plate.

In the extensive and rapid development of the information processing technology, more compact high density information stores, greater ease of handling and communicating information and more versatile readout capacity have become necessary requirements for computing systems. Consequently, it is expected that optically accessed information stores and more proficient readout apparatus, such as printers and displays will be employed in such systems. It is also contemplated that information will be handled and communicated using light beams. In order to accomplish the movement or positioning of these light beams, light deflecting and orienting apparatus has been proposed.

Usually this apparatus takes the form of optically birefringent elements operative in conjunction with means for acting on the polarization of a light beam to permit the birefringent medium to accomplish the movement or displacement of the light beam. The means for acting on the polarization of a light beam may take the form of an electro-optic crystal. Electro-optic crystals act electrically as capacitors, and store electrical charges when operated. Dependent on the characteristics of the crystal material, the wavelength of the light beam incident on the crystal and the potential difference across the crystal, they affect the polarization of the light beam.

The prior art methods of driving electro-optic crystals require the use of elaborate driving circuits employing numerous elements including tubes, transistors and transformers. The individual circuits are expensive. In addition, considerable space is required for packaging the circuits with the light beam deflecting or orienting apparatus. In this application, compact, low cost apparatus is described for accomplishing the switching function for electro-optic crystals.

It is a primary object of the invention to provide improved switching apparatus to supply the charging function for capacitive load circuits.

Another object of the invention is to effect the controlled rotation of polarization of a light beam incident on an electro-optic medium.

A further object of the invention is to provide apparatus for providing the charging function for electro-optic crystals.

It is another object of the invention to provide switching apparatus reversible in operation according to secondary emission phenomena to provide the charging function for an electro-optic crystal.

Briefly, the foregoing objects are accomplished by providing switching apparatus for applying a potential difference across a load circuit. Means for generating a beam of electrons is directed at first and second potential generating means. The potential generating means which have different potential generating characteristics are connected across the load circuit. Means are also provided for activating the electron beam generating means to cause the potential generating means to apply the potential difference across the load.

According to one feature of the invention, an electro-optic crystal is operative in the load circuit to receive the output voltages from the potential generating means. These means operate according to secondary emission phenomena with the first generating means having one secondary emission characteristic and the second generating means having another secondary emission characteristic. The characteristics are sufficient to provide a potential difference across the electro-optic crystal to effect a controlled change of the polarization of a light beam incident on the crystal.

Another feature of the invention provides for a plurality of such first and second potential generating means to be connected in pairs as targets within electron beam tubes. Opposing pairs of targets are connected across the same electro-optic crystal load circuit so that a plurality of such crystals may be driven from the same electron beam generating apparatus.

The foregoing and other objects, features and advantages of the present invention will be apparent from the following more particular description of the preferred embodiments of the invention as illustrated in the accompanying drawings, wherein.

As already stated, the apparatus of this invention is generally applicable for driving capacitive load circuits. Specific application is found in optical systems employing electro-optic phase plates. The phase plates function electrically as capacitive elements when energized to accomplish the controlled rotation of the polarization of a light beam incident on them. As will be apparent from the following description, the extent of the rotation accomplished by an electro-optic phase plate on an incident polarized light beam is dependent on the potential difference applied across the phase plate, the material of the plate and the wave-length of the incident light.

Two such optical systems are described in detail in co-pending applications entitled "Light Beam Deflection System" Ser. No. 285,832, filed June 5, 1963, in the names of Harris et al., and "Light Beam Orienting Apparatus" Ser. No. 285,833, filed June 5, 1963, now Patent No. 3,375,052, in the names of Kosanke et al. Both of these applications are assigned to the same assignee as this invention. Although the inventions of these systems are described in detail in the respective applications, a brief description of each system is provided to facilitate the understanding of this invention.

Figure 1:
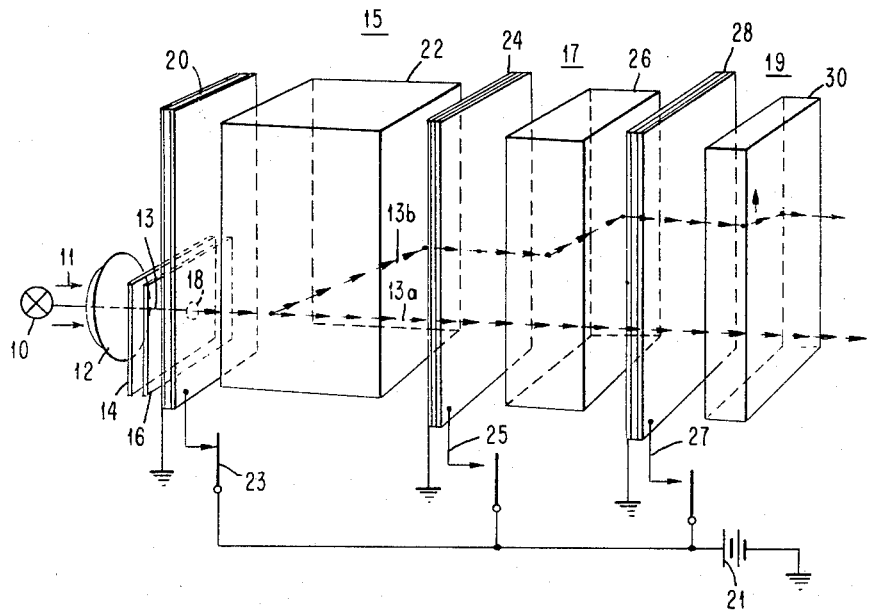
FIG. 1 is a perspective view of a multi-stage light beam deflector employing electro-optic crystals driven by the apparatus of the invention.

Referring now to FIG. 1, there is shown a light deflector for discretely positioning a small cross-sectional beam of linearly polarized light. A high intensity beam 11 of light is provided by a light source 10. Preferably, source 10 provides monochromatic light and is conveniently a continuous wave or pulsed laser light source. Other possible monochromatic light sources include carbon and mercury arc lamps with appropriate filters. Beam 11 is passed through a lens 12 and polarized 14 to polarize linearly the light beam. A portion of the beam 11 emitted by polarizer 14 is passed through an aperture 18 in a plate 16. The beam 13 passing through aperture 18 is directed to the light deflection system formed of stages 15, 17, 19.

Each light deflector stage 15, 17, 19 includes two elements. The first element (for example 20) rotates the polarization of beam 13 dependent on the potential that is applied across it. In this system, the rotator 20 either has no effect on the polarization of the light beam or it rotates the polarization 90 degrees. Light beam 13 leaves electro-optic rotating element 20 with one of two possible polarizations. It is directed at a birefringent crystal 22 which is the second component of the light deflector stage. Electro-optic element 20 is the element of the deflector stage which is acted on by the apparatus of this invention to accomplish the polarization rotation.

Birefringent element 22 is an optical crystal having specially cut surfaces to permit the incoming light beam to pass through the crystal as either the ordinary ray 13a or the extraordinary ray 13b but not both simultaneously. The path of travel of the light beam as the ordinary ray or extraordinary ray depends on its entering polarization. Thus, light beam 13 which is linearly polarized perpendicular to the plane of the drawing passes through birefringent crystal 22 without deflection as ordinary ray 13a of the crystal. When light beam 13 is polarized parallel to the plane of the paper, it passes through birefringent crystal 22 as the extraordinary ray 13b in a direction different from the ordinary ray. Beam 13b leaves crystal 22 at a point spatially separated from the point of exit of the ordinary ray. The rays are, however, parallel to one another.

The light beam (13a or 13b) emitted by birefringent crystal 22 then passes to the second deflection stage 17 including electro-optic crystal 24 and birefringent crystal 26. Operation in the second deflector stage is the same as in the first stage. The beam incident on crystal 24 is polarization rotated by 90° or remains unaffected dependent on the voltage applied across the crystal. It passes through crystal 26 as the ordinary ray or the extraordinary ray dependent on its polarization. It is noted that there are four possible locations where the output beam can be emitted from the second stage.

The beam emitted by the second stage passes through the third stage 19 which is similarly formed of an electro-optic crystal 28 for accomplishing polarization rotation and a birefringent crystal 30. Eight possible output locations are available from the output of the third stage of the deflector. It will be observed that a particular relative thickness relationship is provide for birefringent crystals 22, 26, and 30. This relationship also controls the number and relative relationship of the possible output locations for the beam.

Although only three deflector stages are illustrated in the system of FIG. 1, it is understood that considerably more stages can be provided so that a multitude of discrete linearly related light output positions is achieved. In such systems, the possible output positions for the light beam are controlled by the electrical signals provided across the electro-optic crystals 20, 24 and 28. These signals are shown schematically as being provided from the potential source 21 through the switching elements 23, 25 and 27, respectively. The apparatus of the present invention is intended to perform the function schematically indicated by this potential source and the respective switching elements.

Figure 2:
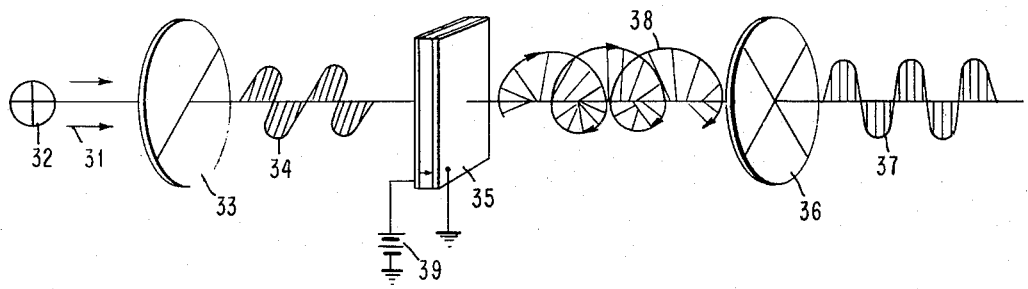
FIG. 2 is a perspective view of a light beam rotator employing an electro-optic crystal driven by the apparatus of the invention.

Referring now to FIG. 2, there is provided a second application of the use of an electro-optic crystal which acts on a linearly polarized light beam to perform a predetermined rotation of the beam. In this application a light beam 31 is directed from a source 32 to a polarizer 33. The orientation of polarizer 33 controls the polarization direction of the beam 34. As shown in FIG. 2, polarizer 33 is positioned to provide beam 34 with a polarization displaced 45 degrees from the vertical axis of the polarizer. Beam 34 is directed at electro-optic crystal 35 which together with a quarter wave plate 36 accomplishes a rotation in the direction of linear polarization of the beam 34 to provide an output beam 37 which is rotated by 45 degrees from the incident beam 34.

The operation of the rotating element of this apparatus depends on the crystalline structure of the electro-optic crystal 35 and the potential difference 39 applied across it. This value of voltage is ordinarily applied in multiples or sub-multiples of the half wavelength voltage for the particular crystalline structure. If no voltage is applied across this crystal the beam emitted by the electro-optic crystal is not altered and has the same form as the incident beam 34. If a voltage equivalent to the half wavelength voltage of the crystal is applied across the crystal, the light beam emitted by crystal 35 is displaced 90 degrees in a horizontal direction from the position of the incident beam 34. If any other value of voltage other than an even or odd full multiple of the half wavelength voltage is applied, a form of elliptical polarized light is emitted by crystal 35. The apogee and perigee of the ellipse and the displacement of them about the vertical and horizontal axes is determined by this value of voltage. For the particular case where the potential difference across device 35 is a half multiple of the half wavelength voltage of the crystal, the device 35 emits circular polarized light such as shown at 38.

The light beam emitted by device 35, for example the circular polarized light beam 38, is applied to quarter wave plate 36. This plate is oriented to retard the circular polarized light beam to produce the linear polarized light beam 37 which is rotated with respect to the incident beam. The angle of rotation for this particular illustration is 45 degrees. In general, it may be stated that the angle of displacement is equal to $\pi/2$ times the voltage applied across the device 35 divided by the half wavelength voltage of the crystalline structure of the device 35.

The apparatus of FIG. 2, therefore, accepts a linearly polarized light beam and rotates the angle of polarization with respect to the original beam, an extent dependent on the voltage across the electro-optic crystal 35 and the material employed in this crystal. The apparatus of the present invention is intended to provide the particular value of voltage to apply across the electro-optic crystal to accomplish a predetermined rotational displacement of a light beam.

It is readily apparent that the successful operation of the light rotators or light deflectors of the application described above depends on the selection of the particular electro-optic crystals that are employed and establishing the necessary half wavelength voltage for these crystals. Crystalline structures having the desired characteristics may be formed of potassium dihydrogen phosphate having the chemical composition $KH_2PO_4$ and referred to as a KDP crystal. A KDP crystal has a half wavelength voltage of approximately 7.5 kv. at a wavelength of approximately 5461 A. Other materials which may be employed for the electro-optic active crystal are ammonium dihydrogen phosphate ($NH_4H_2PO_4$) and potassium dideuterium phosphate (KD$_2$PO$_4$). These compositions have half wavelength voltages of approximately 9.6 kv. and 3.4 kv. respectively.

The electro-optic devices are formed of semi-transparent conductive electrodes applied to a dielectric crystal which as described above may take one of several forms. The mode of fabricating the crystal devices with the transparent electrodes affixed to them is described in an article entitled "Convergent Beam Digital Light Deflector" appearing at chapter 23 of the text "Optical and Electro-Optical Information Processing" (MIT Press, 1965). The specific reference to the method of fabricating the crystals begins at page 409.

Figure 3:
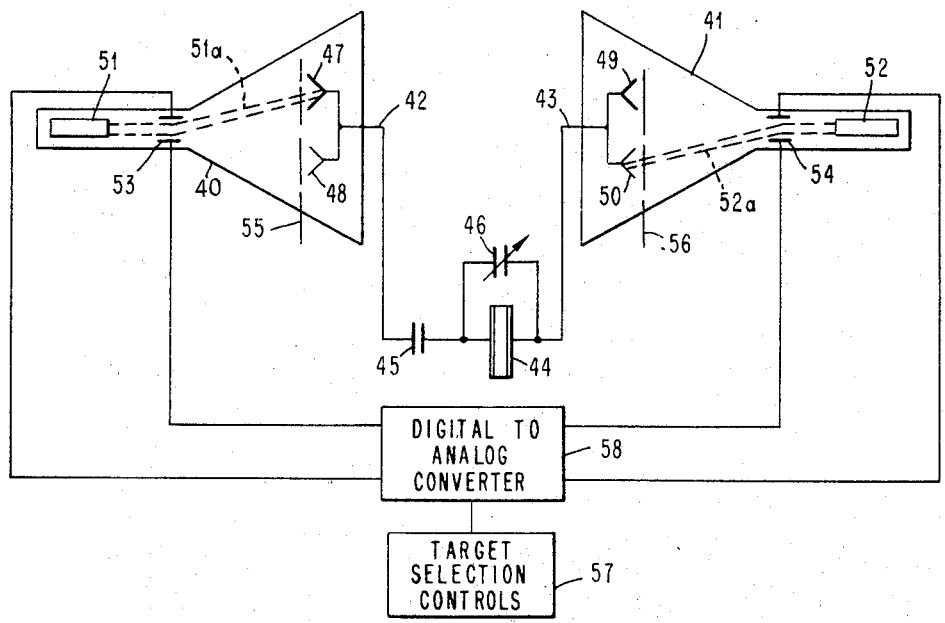
FIG. 3 is a schematic view of one form of the apparatus of the invention for driving an electro-optic crystal.

Referring now to FIG. 3, apparatus for driving a capacitive load circuit and, specifically, a load circuit including an electro-optic crystal includes electron beam tubes 40 and 41, having their outputs at 42 and 43 connected across electro-optic crystal 44. Connected in the output circuit of the electron beam tubes are a capacitor 45 which is employed to absorb any excess potential over that required to provide the necessary voltage across the crystal 44. Also included is a second capacitor 46 which is employed to tune the capacitance of the crystal 44, such that the proper voltage division is achieved across crystal 44 and capacitor 45. Thus, capacitor 46 compensates for any variations in the parameters of crystal 44 and capacitor 45.

Within each beam tube 40, 41, there are a pair of targets 47, 48 and 49, 50 respectively. The target pairs are connected, in turn, to the output circuits 42, 43. Each target may be mounted on a brass or steel holder and materials for causing the proper voltage to be generated are deposited on these holders. One target of each pair is coated with a material that has a predetermined secondary emission characteristic. The other target of each pair is coated with another material that has a predetermined secondary emission characteristic differing from that of the material deposited on the first target. Thus, the targets 47 and 49 have the same secondary emission characteristics and the targets 48 and 50 have the same secondary emission characteristics.

Figure 5:
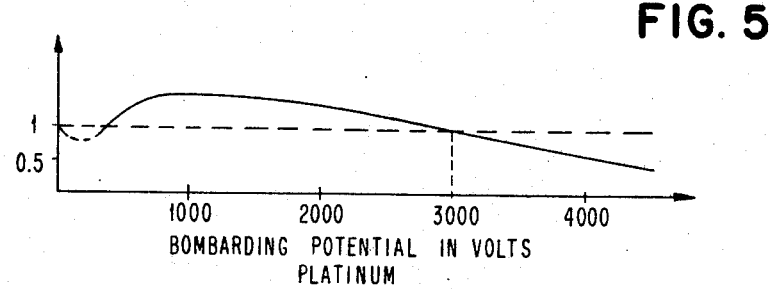
FIGS. 5 and 6 are graphs illustrating the secondary emission characteristics of illustrative materials that may be employed in the apparatus of the invention.
Figure 6:
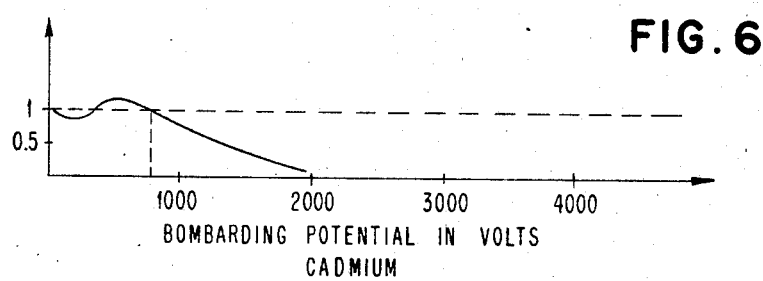

Two such materials that are described by way of illustration are cadmium and platinum. These materials have secondary emission characteristics sufficient to provide a potential difference across an electro-optic crystal to effect the rotation of the polarization of a light beam incident on the crystal. The approximate secondary emission characteristics of platinum and cadmium are shown in FIGS. 5 and 6 respectively. Although the metals cadminum and platinum are described as being used as the target materials in the apparatus of this invention, it is to be understood that other materials including non-metals may also be utilized.

Beam tubes 40, 41 also include electron guns 51, 52, respectively, which provide coarse high current beams of electrons 51$a$, 52$a$. The structure of the electron gun is shown more particularly in FIG. 7. This electron gun is intended to provide a particular value of beam current which is sufficient to generate a desired value of voltage at the output of the electron beam tube in a specific time interval.

Figure 7:
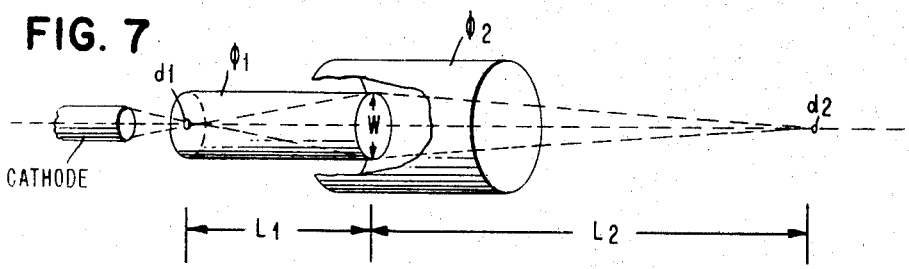
FIG. 7 is an enlarged schematic view of the electron gun structure used in the apparatus of the invention.

Referring to FIG. 7, the coarse beam of electrons can be obtained from an electron gun designed according to the Langmuir equation ("Limiting Current Densities in Electron Beams" Journal of Applied Physics, volume 10, page 715, October 1939).

$$I = \frac{\pi d_2^2}{4} \cdot E_i \left(1 + \frac{11600}{T} \phi_2\right) \frac{W^2}{4L_2^2} \cdot j_0$$

where:

$j_0$=cathode current density
$E_i$=fraction of cathode current in the beam
$T$=cathode temperature in degrees Kelvin
$d_2$=diameter of beam spot at the target
$W$=diameter of the first anode aperture
$L_1$ and $L_2$=focal lengths of first and second lenses
$d_1$=diameter of beam spot at the first anode
$\phi_1$ and $\phi_2$=potentials at first and second anodes Referring again to FIG. 3, electron beam tubes 40 and 41 also include appropriate pairs of deflection plates for controlling the XY excursion of the beams provided by the electron guns 51 and 52. The deflection plates are indicated schematically at 53 and 54, respectively. Suitable collector grids 55 and 56 are also connected in the electron beam tubes to collect the charge from the beam that impinges on the pairs of targets 47, 48 and 49, 50.

The control of the deflection of the beams 51$a$, 52$a$ within tubes 40 and 41 so that the correct targets are selected by the beam is accomplished by target selection control circuitry 57. Circuitry 57 supplies digitally encoded signals to a digital-to-analog converter 58 which acts on the deflection plates to control the excursion of the beams within the tubes 40, 41.

Figure 4:
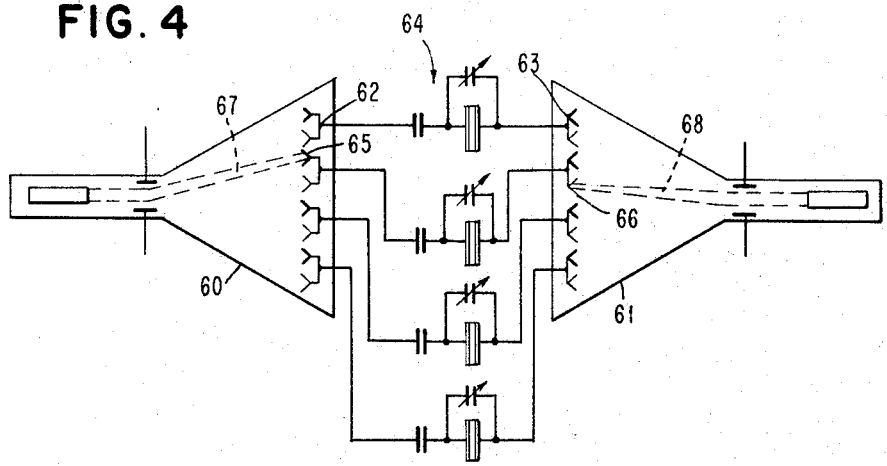
FIG. 4 is a schematic view of a multi-target form of the apparatus embodying the principles of the invention.

A multi-target version of the apparatus for driving electro-optic crystals is depicted in FIG. 4. Four pairs of targets are mounted in each electron beam tube 60, 61. The targets having secondary emission characteristics of one type are indicated with the heavy lines and the targets having secondary emission characteristics of the other type are designated with the light lines. Each pair of targets in a tube is connected through an electro-optic crystal load circuit with a corresponding pair of targets in the other tube. For example, the target pairs 62, 63 are connected across load circuit 64. Energizing of a pair of targets such as the target 65 of tube 60 and the target 66 of tube 61 is accomplished by the electron beams 67, 68, respectively. The beams are operated under the control of the target selection circuitry described in connection with FIG. 3.

It is readily apparent that a substantial number of such pairs of targets may be mounted in electron beam tubes and connected in the manner described in FIGS. 3 and 4 to provide the switching function for an electro-optic crystal. Each crystal may be employed with a single stage of a light deflector of the type described in FIG. 1. For example, if a 20 stage deflector is contemplated, 20 such pairs of targets may be arranged in a 5 x 8 array within each tube. Each target would be 1 centimeter in diameter with one-half centimeter spacing between the targets. The screen of the tube would have a diameter approximating 6 inches. The electrical connections to the individual electro-optic crystals would be provided by wires through the face of the tube.

Operation of the apparatus of this invention may be considered by referring again to FIG. 3. It is assumed that the accelerating electron beam potential in each tube is 3200 volts and that beam 51$a$ emitted by electron gun 51 in tube 40 is directed at the platinum target 47 and beam 52$a$ from electron gun 52 is directed at cadmium target 50. Target 47 charges until the electrons bombard this target with a potential of 3,000 volts. This is the unity secondary emission ratio (FIG. 5) for such a target. Simultaneously, the cadmium target is bombarded until the potential of 700 volts is achieved. This is the unity secondary emission ratio (FIG. 6) for this target. The platinum target has therefore assumed a potential of −200 volts and the cadmium target a potential of −2500 volts. A potential difference of 2300 volts is established across the capacitor load circuit combination, including the electro-optic crystal 44 and the capacitors 45, 46. The potential of 2300 volts is slightly greater than necessary to accomplish a 90 degree phase shift of a polarized light beam by a KDP phase plate. Capacitor 45 is employed to absorb the excess potential and capacitor 46 is utilized to tune the electro-optic crystal 44 such that the proper voltage division is accomplished across 44 and 45.

If the potential across crystal 44 is to be reversed beam 52$a$ is directed at platinum target 49 and beam 51$a$ is directed at cadmium target 48. Beam 52a initially bombards target 49 with a potential of 700 volts. This results in a secondary emission ratio greater than unity and platinum target 49 loses electrons until the beam bombards the target with a potential of 3,000 volts. The platinum target then assumes a potential of −200 volts. Similarly, beam 51a bombards cadmium target 48 with a potential of 3,000 volts until the target accumulates enough electrons to charge to −2500 volts. The beam potential is then 700 volts to establish the 2300 volt potential difference across the crystal 44.

To obtain the necessary potential difference of 2300 volts across an electro-optic crystal the necessary beam current can be calculated for generating sufficient secondary electrons in the targets to provide this potential difference in a particular period of time. As already stated, an electron gun adequate to provide such a beam current may be designated using the Langmuir equation.

For example, if it is considered that deuterated KDP electro-optic crystals are to be employed in the light beam orienting apparatus with maximum dimensions of 25 x 25 x 2 millimeters. The capacity of such a crystal is:

$$C = \frac{\epsilon A}{d}$$

when C is the capacitance, $\epsilon$ is the relative dielectric constant of the material, A is the area of the crystal and d is the thickness of such a crystal. Then:

$$C = \frac{(40)(8.85 \times 10^{-12})(6.25 \times 10^{-4})}{2 \times 10^{-6}}$$

$C = 110 \; \mu\mu f.$

If it is assumed that the charging time for such a crystal approximates 20 microseconds and that on the average one-half the beam current is effective due to secondary emission, then the beam current necessary to provide the proper potential is:

$$I_b = \frac{2CV}{\tau}$$

where C is the capacitance, V is the potential difference across the electro-optic crystal and $\tau$ is the charging time of the crystal. Then:

$$I_b = 2 \frac{(1.10 \times 10^{-10})(2.3 \times 10^3)}{20 \times 10^{-6}}$$

$I_b = 25.4$ milliamps.

Figure 8:
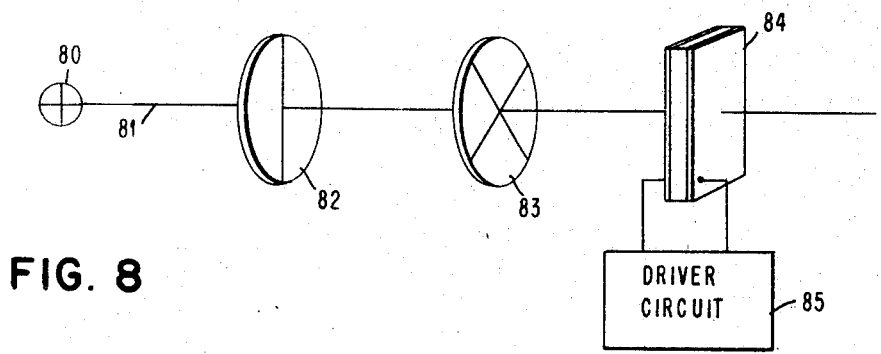
FIG. 8 is another modified form of the apparatus of the invention.

Although the electro-optic crystals have been described as being employed, one for each stage in a deflector, it is readily apparent that other arrangements may also be employed. For example, if a passive quarter wave plate is connected optically in series (optical bias) with an electro-optic plate the switching voltage that the apparatus of this invention must provide across the electro-optic crystal may be reduced in half. Such an arrangement is shown in FIG. 8 where a light source 80 directs a beam of light 81 through a polarizer 82 to passive quarter wave plate 83. Passive wave plate 83 acts together with electro-optic crystal 84 to effect the proper rotation of the polarization of the light beam. A driver circuit, such as that shown in FIG. 3, is indicated in block form at 85 as being connected across the crystal 84. Thus, the value of voltage required across the crystal may be reduced.

Use of this arrangement is of particular value with longer wavelengths of the light since the value of the half wave voltage increases as the wavelength increases. Light of wavelength 4880 A. requires an applied potential across the crystal of 3600 volts to effect a 90 degree polarization rotation, whereas light of wavelength 6328 A. requires a value of voltage of 4200 volts to effect the same rotation.

It should also be apparent that two or more such electro-optic crystals may be employed in series to further reduce the necessary potential difference generated by the electron beams. Driving of these crystals can be performed by two independent electron beam tube systems operating in parallel, or by driving both electro-optic crystals from one such electron beam tube system. It is apparent that serial operation is slower than parallel operation as twice the value of capacitance must be charged in the serial type of operation.

Moreover, it should be understood that the apparatus of this invention may be used with electro-optic crystals in other than light orienting apparatus. For example, this invention may be used with an electro-optic crystal located within a laser cavity and operative for laser frequency selection.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for applying a potential difference across a load, comprising
    means for generating a beam of electrons,
    first and second potential generating means responsive to the beam of electrons and electrically connected across the load,
    each of the potential generating means having different potential generating characteristics, and
    means for activating the beam means to provide the electron beam for response by the potential generating means whereby the potential difference is applied across the load.

2. The apparatus of claim 1, wherein the means for generating a beam of electrons comprises first and second electron beam tubes, each of the tubes having a plurality of targets arranged in pairs so that corresponding targets in each pair are operative as the first potential generating means and the other targets in each pair are operative as the second potential generating means,
    the load comprises a plurality of individual capacitive circuits each connected to a pair of targets in each tube, and
    the means for activating the beam means is operative selectively to direct the electron beam in one tube to a target having the first potential generating characteristic and the electron beam in the other tube to a target having the second potential generating characteristic and with the same load circuit, whereby the load circuit having its potential generating means selected has a potential difference applied across it.

3. The apparatus of claim 2, wherein the corresponding targets in each pair have one secondary emission characteristic and the other targets of each pair have another secondary emission characteristic, so that in response to the electron beam the potential across the load is generated through secondary emission phenomena.

4. Circuitry for driving a load, comprising first and second electron beam means having their outputs electrically connected to provide a potential difference across the load,
    the first and second electron beam means each having target means with first and second potential generating characteristics, said target means being responsive to the respective electron beams to provide the respective outputs of the electron beam means, and
    means for selectively activating the electron beam means to direct the respective beams to target means having different potential generating characteristics, whereby a reversible potential difference is applied across the load.

5. The circuitry of claim 4, wherein the first and second potential generating characteristics of the targets are determined by their secondary emission characteristics, one target in each tube having one secondary emission characteristic and the other target in each tube having another secondary emission characteristic.

6. Apparatus for supplying the charging function to a capacitive load circuit, comprising
   first potential generating means having one secondary emission characteristic,
   second potential generating means having another secondary emission characteristic,
   said potential generating means being connected across the capacitive load circuit, and
   means for activating the potential generating means to provide a potential difference through secondary emission phenomena for charging the load circuit in accordance with the potential difference.

7. Apparatus for effecting a controlled polarization rotation of a polarized light beam, comprising
   an electro-optic device in the path of said beam for transmission of the beam through it and responsive to the amount of charge across it to effect said controlled rotation,
   first potential generating means having one secondary emission characteristic,
   second potential generating means having another secondary emission characteristic,
   said potential generating means being connected across said device, and
   means for activating the potential generating means to provide a potential difference through a secondary emission phenomena for charging across the device, whereby the polarization of the light beam transmitted by the device is rotated in accordance with the potential difference.

8. The apparatus of claim 7, wherein the apparatus further comprises
   first capacitive means in series with the electro-optic device to absorb any potential difference exceeding a desired amount supplied to the device, and
   second capacitive means in parallel with the electro-optic device for compensating for any parameter variations of the electro-optic device and first capacitive means.

References Cited

UNITED STATES PATENTS

| | | | |
|---|---|---|---|
| 2,069,441 | 2/1937 | Headrick | 315—12 |
| 2,481,458 | 9/1949 | Wertz | 315—8.6 |
| 3,388,276 | 6/1968 | Spencer | 313—68 |

TERRELL W. FEARS, Primary Examiner

H. L. BERNSTEIN, Assistant Examiner

U.S. Cl. X.R.

313—68, 73; 315—12